US006490352B1

United States Patent
Schroeppel

(10) Patent No.: US 6,490,352 B1
(45) Date of Patent: Dec. 3, 2002

(54) CRYPTOGRAPHIC ELLIPTIC CURVE APPARATUS AND METHOD

(76) Inventor: Richard Schroeppel, 500 S. Maple Dr., Woodland Hills, UT (US) 84653

(*) Notice: Subject to any disclaimer, the term of this patent is extended or adjusted under 35 U.S.C. 154(b) by 0 days.

(21) Appl. No.: 09/518,389

(22) Filed: Mar. 3, 2000

Related U.S. Application Data

(60) Provisional application No. 60/122,988, filed on Mar. 5, 1999.

(51) Int. Cl.[7] .................................................. H04L 9/30
(52) U.S. Cl. ............................ 380/30; 380/28; 380/44; 380/279
(58) Field of Search ............................. 380/28, 30, 44, 380/279, 282

(56) References Cited

U.S. PATENT DOCUMENTS

| | | | |
|---|---|---|---|
| 5,442,707 A | | 8/1995 | Miyaji et al. ................. 380/30 |
| 5,805,703 A | | 9/1998 | Crandall ....................... 380/30 |
| 5,982,895 A | * | 11/1999 | Dworkin et al. ............... 380/9 |
| 6,141,420 A | * | 10/2000 | Vanstone et al. ............. 380/30 |
| 6,163,841 A | * | 12/2000 | Venkatesan et al. ......... 713/176 |
| 6,252,959 B1 | * | 6/2001 | Paar et al. .................... 380/28 |

OTHER PUBLICATIONS

Schroeppel, R. et al., "Fast Key Exchange with Elliptic Curve Systems," Advances in Cryptology—CRYPTO '95, Aug. 31, 1995, pp. 43–56.*

Vanstone, S.A. et al., "Elliptic Curve Cryptosystems Using Curves of Smooth Order Over the Ring Zn," IEEE Trans. on Information Theory, vol. 43, No. 4, Jul. 1997, pp. 1231–1237.*

"New Public–Key Schemes Based on Elliptic Curves over the Ring $Z_n$," 1991 Kenji Koyama excerpt, Advances in Cryptology—Crypto 1991, ©1998 Springer–Verlag, pp. 252–266.

* cited by examiner

*Primary Examiner*—Justin T. Darrow
(74) *Attorney, Agent, or Firm*—Pate Pierce & Baird

(57) ABSTRACT

An apparatus for operating a cryptographic engine may include a key generation module for creating key pairs for encrypting substantive content to be shared between two users over a secured or unsecured communication link. The key generation module may include a point-doubling module as part of an elliptic curve module for creating and processing keys. Hash functions may be used to further process ephemeral secrets or ephemeral keys that may be used for transactions, sessions, or other comparatively short time increments of communication. The keys generated by the key generation module may be configured to be processable by an encryption system for divulging independently to two independent parties a secret to be shared by the two independent parties. A single-inversion, point-doubling algorithm may be provided to reduce the operation count of a cryptographic process.

25 Claims, 6 Drawing Sheets

Cryptographic System

Cryptographic System

CRYPTOGRAPHIC ELLIPTIC CURVE APPARATUS AND METHOD

RELATED APPLICATIONS

This application claims the benefit of earlier-filed U.S. Patent Application No. 60/122,988, filed Mar. 5, 1999, for "Doubling of Elliptic Curve Points over GF(2N)," which is in corporated herein by reference.

BACKGROUND

1. The Field of the Invention

This invention relates to cryptography and, more particularly, to novel systems and methods for increasing the speed of cryptographic key computations by computers.

2. The Background Art

The science of cryptography has existed since ancient times. In recent years, cryptography has been used in special purpose software programs for a variety of purposes, such as hiding underlying contents, limiting access, inhibiting reverse engineering, authenticating sources, limiting unauthorized use, and the like.

Cryptographic Processes

Modem cryptography protects data transmitted over a network or stored in computer systems. Two principal objectives of cryptography include (1) secrecy, e.g., to prevent the unauthorized disclosure of data, and (2) integrity (or authenticity), e.g., to prevent the unauthorized modification of data. Encryption is the process of disguising plaintext data in such a way as to hide its contents, and the encrypted result is known as ciphertext. The process of turning ciphertext back into plaintext is called decryption.

A cryptographic algorithm, also known as a cipher, is a computational function used to perform encryption and/or decryption. Both encryption and decryption are controlled by one or more cryptographic keys. In modem cryptography, all of the security of cryptographic algorithms is based on the key(s) and does not require keeping the details of the cryptographic algorithms secret.

There are two general types of key-based cryptographic algorithms: symmetric and public-key. In symmetric algorithms, the encryption key can be calculated from the decryption key and vice versa. Typically, these keys are the same. As such, a sender and a receiver agree on the keys (a shared secret) before they can protect their communications using encryption. The security of the algorithms rests in the key, and divulging the key allows anyone to encrypt and decrypt data or messages with it.

In public-key algorithms (also called asymmetric algorithms), the keys used for encryption and decryption differ in such a way that at least one key is computationally infeasible to determine from the other. To ensure secrecy of data or communications, only the decryption key need be kept private, and the encryption key can thus be made public without danger of encrypted data being decipherable by anyone other than the holder of the private decryption key.

Conversely, to ensure integrity of data or communications, only the encryption key need be kept private, and a holder of a publicly-exposed decryption key can be assured that any ciphertext that decrypts into meaningful plaintext using this key could only have been encrypted by the holder of the corresponding private key, thus precluding any tampering or corruption of the ciphertext after its encryption.

A private key and a public key may be thought of as functionally reciprocal. Thus, whatever a possessor of one key of a key pair can do, a possessor of the other key of the key pair can undo. Accordingly, secret information may be communicated without an exchange of keys.

An asymmetric algorithm assumes that public keys are well publicized in an integrity-secure manner. A sender can then know that the public key of the receiver is valid and not tampered with. One way to ensure integrity of data packets is to run data through a cryptographic algorithm. A cryptographic hash algorithm may encrypt and compress selected data. Various cryptographic hash algorithms are known, such as the Secure Hash Algorithm (SHA) and Message Digest 5 (MD5).

A certificate is a data structure associated with assurance of integrity and/or privacy of encrypted data. A certificate binds the identity of a holder to a public key of that holder, and may be signed by a certification authority (CA). In a public key infrastructure (PKI), a hierarchy of certification authorities may be provided, each level vouching for the authenticity of the public keys of subordinate levels.

A certificate may contain data regarding the identity of the entity being certified, the key held (typically a public key), the identity (typically self-authenticating) of the certifying authority issuing the certificate to the holder, and a digital signature protecting the integrity of the certificate itself. A digital signature may typically be based on the private key of the certifying authority issuing the certificate to the holder. Thus, any entity to whom the certificate is asserted may verify the signature corresponding to the private key of the certifying authority.

In general, a signature of a certifying authority is a digital signature. The digital signature associated with a certificate enables a holder of the certificate, and one to whom the certificate is asserted as authority of the holder, to use the signature of the certifying authority to verify that nothing in the certificate has been modified. This verification is accomplished using the certificate authority's public key, thus providing a means for verifying the integrity and authenticity of the certificate and of the public key in the certificate.

Various cryptographic techniques rely on elliptic curves. Code and documentation for the use of elliptic curves in cryptography are available. For example, standard references, including certain algebra texts discussing Galois Fields, sometimes called "finite fields," are available in the art.

One reason for interest in acceleration of elliptic curve processing is the increasing size of cryptographic keys. Mathematical calculations often increase geometrically with the size of the keys. Accordingly, if the speed of elliptic curve processing can be increased, less processing time is required for more secure, longer cryptographic keys. Thus, what is needed is methods and apparatus for accelerating computations associated with creating, weaving, and processing of cryptographic keys.

BRIEF SUMMARY AND OBJECTS OF THE INVENTION

In view of the foregoing, it is a primary object of the present invention to provide an apparatus and method comprising an elliptic curve, point-doubling system.

Consistent with the foregoing object, and in accordance with the invention as embodied and broadly described herein, an apparatus and method are disclosed in certain embodiments of the present invention as including a method and apparatus for operating a cryptographic engine supporting a key generation module. The key generation module creates key pairs for encryption on substantive content to be shared between two users over a secured or unsecured communication link.

A principal feature provided by an apparatus and method in accordance with the invention includes a point-doubling module as part of an elliptic curve module within a key generation module for creating and processing keys. Hash functions may be used to further process ephemeral secrets or ephemeral keys that may be used for transactions, sessions, or other comparatively short time increments of communication.

The keys generated by the key generation module may be configured to be processable by an encryption system for divulging independently to two independent parties a secret to be shared by the two independent parties. In various embodiments, a single-inversion, point-doubling algorithm is provided to reduce the operation count of a cryptographic process.

In one aspect of the invention, the point doubling module may include a register for storing an ordered pair of variables selected to be operated on for executing single-inversion point-doubling. The ordered pairs may represents a set of coordinates corresponding to a point on an elliptic curve.

In another aspect, the point-doubling module may include a plurality of ordered tuples reflecting points on an abelian variety. The ordered tuples may include ordered pairs. An ordered pair may include a first element and a second element, wherein the value of the second element may include the result of an exclusive OR operation on the first element and a previous value of the second element. In various embodiments, the abelian variety may include a hyperelliptic curve.

In yet another aspect, the ordered pair may include first and second elements, wherein the second element is a ratio reflecting coordinates of a first point on an elliptic curve. In various embodiments, the ratio may be a quotient of a Y coordinate divided by an X coordinate on an elliptic curve. Moreover, the first point may be computed by a computation method selected from the group consisting of a multiplication, a division, and a multiplication and a division. The computation method may operate on first and second points on an elliptic curve.

In still another aspect, the apparatus may include an application module programmed to execute a function selected from encryption of a substantive content, decryption, maintaining privacy of private information, authentication of received information, validation of exchanged information, a digital signature, hashing, key distribution, random number generation, determining the order of a curve, determining the order of a point, determining the discrete logarithm of a point, and breaking a cryptographic system.

In another aspect of the invention, the elliptic curve module may include a point multiplication algorithm using two distinct representations of a selected points on an elliptic curve. In various embodiments, the two distinct representations include a first representation and a second representation, wherein the point multiplication algorithm selectively alternates between processing the first representation and the second representation.

The above objects may be met by one or more embodiments of an apparatus and method in accordance with the invention. Likewise, one or more embodiments of an apparatus and method in accordance with the invention may provide the desirable features as described.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

Figure 1:
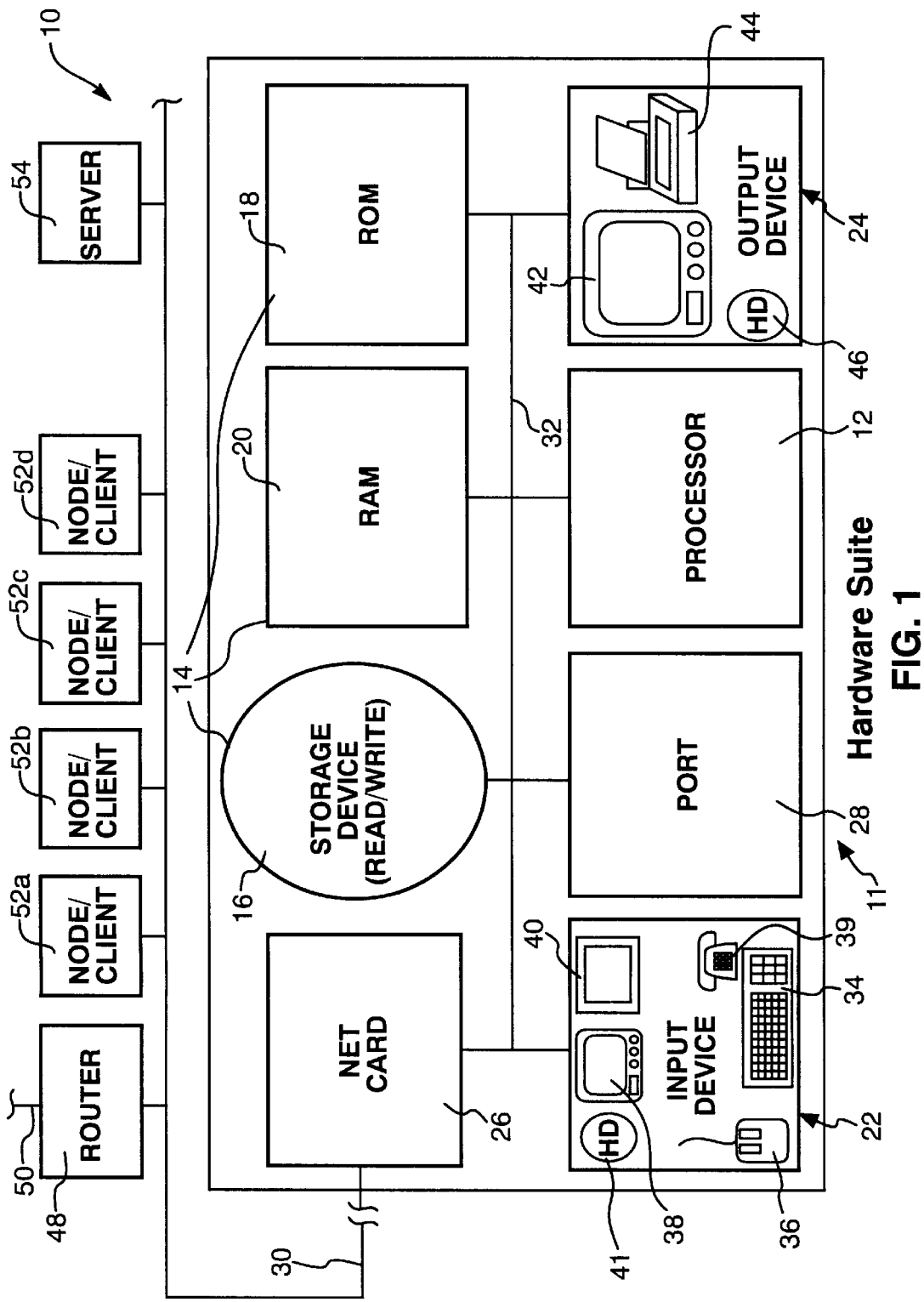
FIG. 1 is a schematic block diagram of an apparatus suitable for implementing a method and system in accordance with the invention for an individual user, or multiple users communicating over a network or internetwork.

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 6, is not intended to limit the scope of the invention, as claimed, but it is merely representative of certain presently preferred embodiments of the invention.

The presently preferred embodiments of the invention will be best understood by reference to the drawings, wherein like parts are designated by like numerals throughout. Reference numerals having trailing letters may be used to represent specific individual items (e.g. instantiations) of a generic item associated with the reference numeral. Thus, a number 156a, for example, may be the same generic item as number 156f, but may result from a different version, instantiation, or the like. Any or all such items may be referred to by the reference numeral 156.

Referring to FIG. 1, an apparatus 10 may implement the invention on one or more nodes 11, (client 11, computer 11) containing a processor 12 or CPU 12. All components may exist in a single node 11 or may exist in multiple nodes 11, 52 remote from one another. The CPU 12 may be operably connected to a memory device 14. A memory device 14 may include one or more devices such as a hard drive or non-volatile storage device 16, a read-only memory 18 (ROM) and a random access (and usually volatile) memory 20 (RAM).

The apparatus 10 may include an input device 22 for receiving inputs from a user or another device. Similarly, an output device 24 may be provided within the node 11, or accessible within the apparatus 10. A network card 26 (interface card) or port 28 may be provided for connecting to outside devices, such as the network 30.

Internally, a bus 32 may operably interconnect the processor 12, memory devices 14, input devices 22, output devices 24, network card 26 and port 28. The bus 32 may be thought of as a data carrier. As such, the bus 32 may be embodied in numerous configurations. Wire, fiber optic line, wireless electromagnetic communications by visible light, infrared, and radio frequencies may likewise be implemented as appropriate for the bus 32 and the network 30.

Input devices 22 may include one or more physical embodiments. For example, a keyboard 34 may be used for interaction with the user, as may a mouse 36 or similar pointing device. A touch screen 38, a telephone 39, or simply a telephone line 39, may be used for communication with other devices, users, or the like. Similarly, a scanner 40 may be used to receive graphical inputs which may or may not be translated to other character formats. A memory device 41 of any type (e.g. hard drive, floppy, etc.) may be used as an input device, whether resident within the node 11 or some other node 52 on the network 30, or from another network 50.

Output devices 24 may likewise include one or more physical hardware units. For example, in general, the port 28 may be used to accept inputs and send outputs from the node 11. A monitor 42 may provide outputs to a user for feedback during a process, or for assisting two-way communication between the processor 12 and a user. A printer 44 or a hard drive 46 may be used for outputting information as output devices 24.

In general, a network 30 to which a node 11 connects may, in turn, be connected through a router 48 to another network 50. In general, two nodes 11, 52 may be on a network 30, adjoining networks 30, 50, or may be separated by multiple routers 48 and multiple networks 50 as individual nodes 11, 52 on an internetwork. The individual nodes 52 (e.g. 11, 52, 54) may have various communication capabilities.

In certain embodiments, a minimum of logical capability may be available in any node 52. Note that any of the individual nodes 11, 52, 54 may be referred to, as may all together, as a node 11 or a node 52. Each may contain a processor 12 with more or less of the other components 14–44.

A network 30 may include one or more servers 54. Servers may be used to manage, store, communicate, transfer, access, update, and the like, any practical number of files, databases, or the like, for other nodes 52 on a network 30. Typically, a server 54 may be accessed by all nodes 11, 52 on a network 30. Nevertheless, other special functions, including communications, applications, directory services, and the like may be implemented by an individual server 54 or multiple servers 54. A node 11 may be a server 54.

In general, a node 11 may need to communicate over a network 30 with a server 54, a router 48, or nodes 52 or server 54. Similarly, a node 11 may need to communicate over another network (50) in an internetwork connection with some remote node 52. Likewise, individual components 12–46 may need to communicate data with one another. A communication link may exist, in general, between any pair of devices. The process and method of the invention may be performed on the hardware structure illustrated in FIG. 1.

Figure 2:
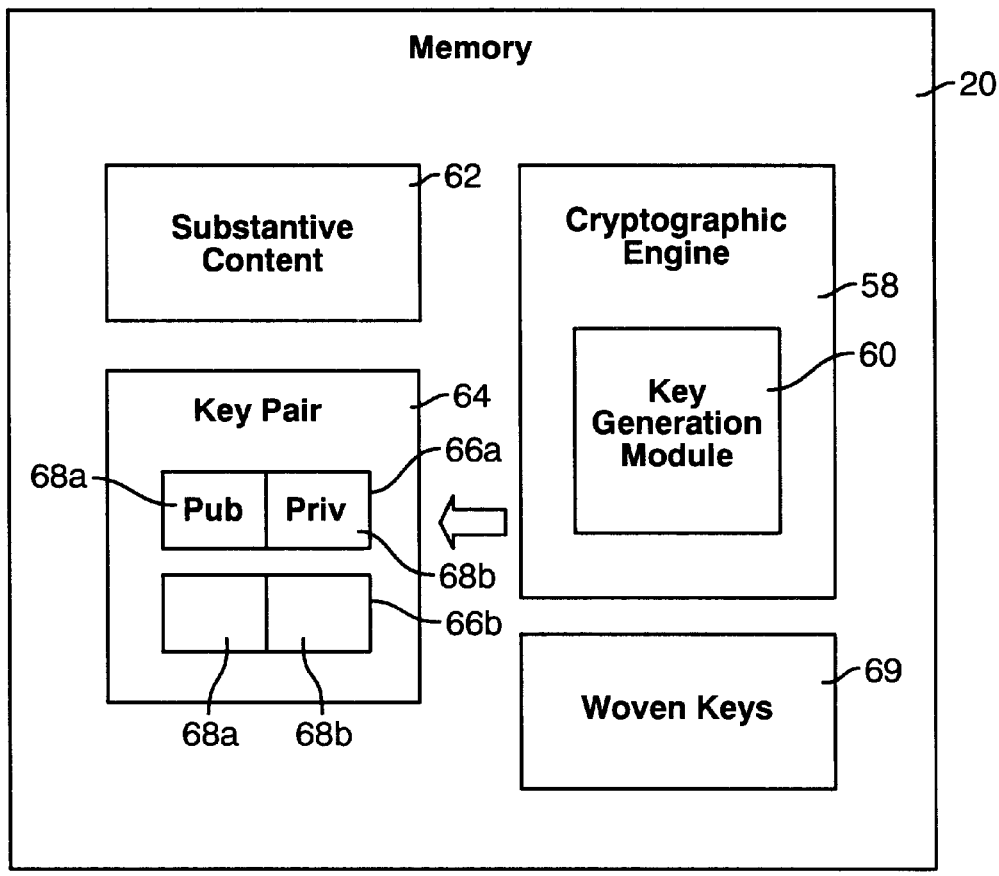
FIG. 2 is a schematic block diagram of select modules that may be hosted in a memory device operating on a computer of a user in accordance with the invention.

Referring to FIG. 2, a memory device 20 in an apparatus 10, and more particularly in an individual computer 11, may include a cryptographic engine 58 for creating, manipulating, processing, using, and otherwise operating on cryptographic keys. Cryptographic keys are known in the art. A key generation module 60 may be responsible for creating keys that may be used to encrypt substantive content 62 for one of a multitude of purposes. As discussed above, the substantive content 62 may be used for various functionalities, including transmission of the substantive content 62 between users.

In general, a key generation module 60 may support local and remote repositories 64 of key pairs 66. A key pair 66 may involve a public key 68a and a private key 68b. In alternative embodiments, a particular key pair 66a may include symmetric keys 68a, 68b. However, in current strong cryptography, the individual keys 68a, 68b are a public/private pair used as described above for preparing and processing information to be sent and received.

In certain embodiments, keys 68a, 68b from various users may be mixed and matched between public and private keys in order to prepare woven keys 69 that are used by senders and receivers on opposite ends of a communication link to securely hide, authenticate, sign, etc., substantive content 62 being exchanged.

Figure 3:
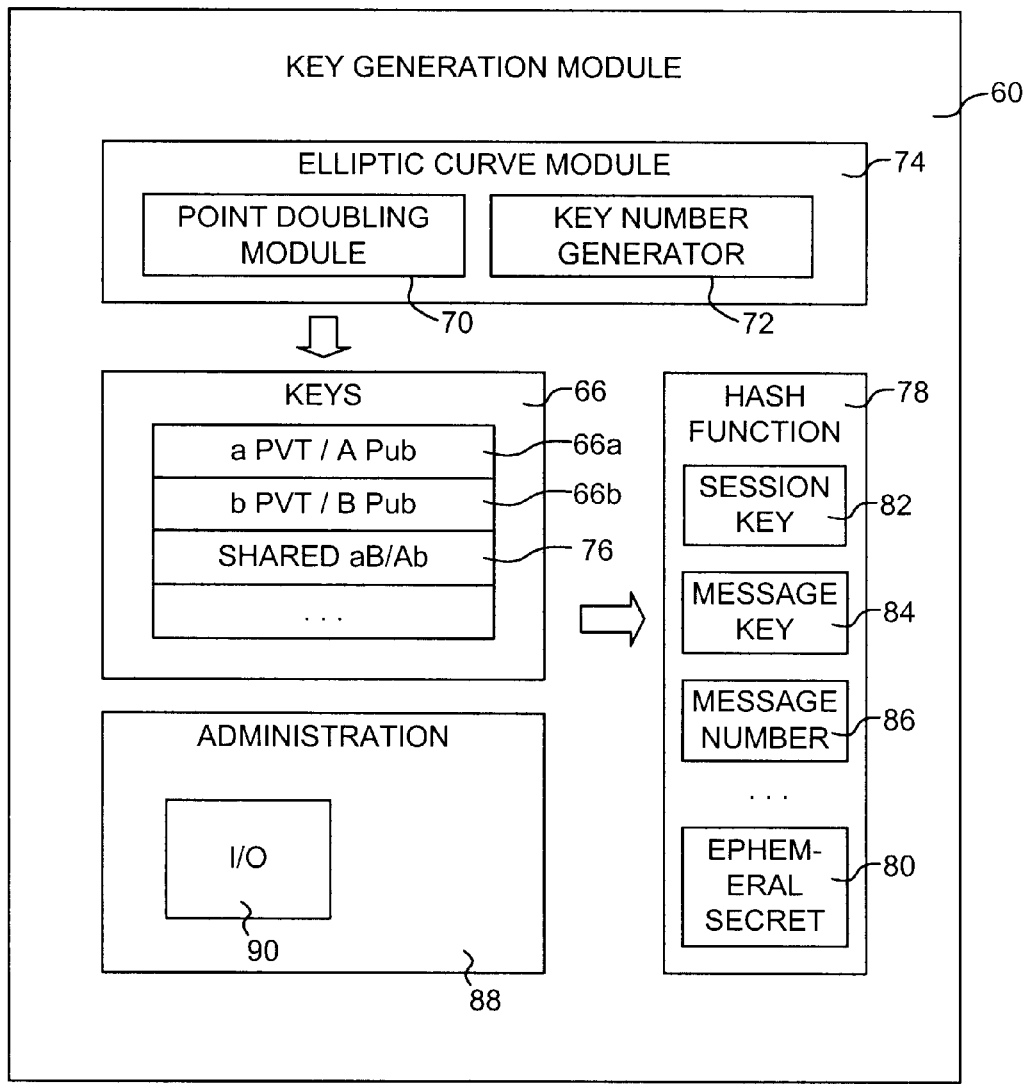
FIG. 3 is a schematic block diagram of a key generation module that may implement certain aspects of a method and system in accordance with the invention.

Referring to FIG. 3, the key generation module 60 may include an elliptic curve module 74 in accordance with the invention. In one presently preferred embodiment, a point-doubling module 70 may operate in accordance with the algorithms described hereinafter, to generate the keys 68 provided by the key generation module 60. A key number generator 72 may include an executable of basic simplicity or considerable sophistication in order to create keys having a desired level of security. Levels of security are typically defined in terms of the algorithms executed by key number generators 72, and equivalent processing 72 executed upon receipt of encrypted information.

Key pairs 66, such as the public/private pairs 66a, 66b or the shared, woven keys 76, may be processed by a hash function 78. The hash function 78 may typically operate on an ephemeral secret 80. An ephemeral secret 80 may be embodied in a session key 82 shared by two users over a communication link during a "session" period of time defined by the users or by their respective computers. Similarly, for a single communication of substantive content 62, an individual message key 84 may be created and relied upon. In one embodiment, a message key 84 may be embodied simply as a message number 86 corresponding to a time, random number, or some combination of numbers associated by a user with a single message.

Practicalities of computation associated with cryptography require that some number of administration modules 88 provide support for the key generation module 60. For example, in one embodiment, input/output drivers 90 may be provided. Likewise, the input/output systems 90 may provide the wrapping, pre-processing, post-processing, maintenance, verification, etc. associated with creating, distributing, using, and management of the keys 68.

Figure 4:
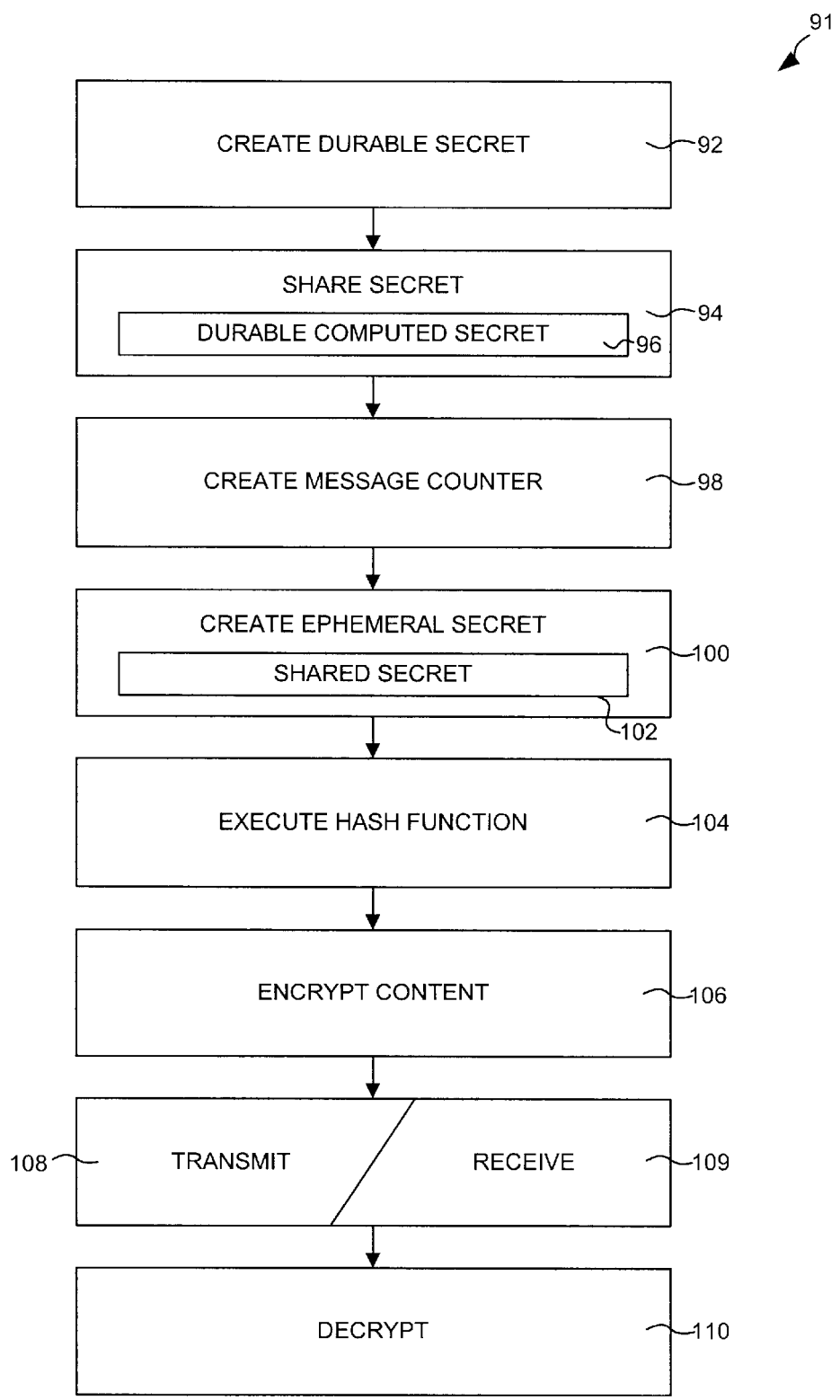
FIG. 4 is a schematic block diagram of a process for encryption using a method in accordance with the invention.

Referring to FIG. 4, a method 91 for using the apparatus and systems in accordance with the invention may involve creating 92 a durable secret. A durable secret may refer to a shared key (whether symmetric or asymmetric) that will be relied upon over an extensive period of time, such as a year.

Sharing 94 the durable secret involves an exchange, distribution, or the like of a durable secret 96 or computed secret 96 sufficiently strong to be reliable over an extensive period of time involving numerous communications between users. In order to initiate use, creating 98 a message counter may occur during individual transactions, in preparation for a short sequence of transactions, or for some other time period that is comparatively short, spanning a transaction, a few transactions, or the like.

In general, the message counter 98 will be used for creating 100 an ephemeral secret 80. For example, the shared secret 102 may have a duration of a single message, or a single computer session, or the like. Thus, the shared secret 102 may be an ephemeral secret 80 of a comparatively short length, or suitable for processing by a comparatively simple process. However, creating 100 an ephemeral secret 80, such as the shared secret 102 may be computationally very intensive due to both the manipulations of numbers required as well as the frequency with which such creating 100 is done.

Executing 104 a hash function may be done as known in the art or as described in the art. Hashing 104 provides verification to both machines and users that no message modification, whether intentional or simply due to a computer glitch, has occurred. Hashing is also used to operate on the woven key 69 and the message number 86 to create an ephemeral symmetric key.

Thereafter, encrypting 106 substantive content 62 may be followed by a transmission 108 and corresponding receipt 109 of the substantive content 62. The substantive content 62 may have been prepared with a cryptographic system. Note that the substantive content 62 may merely be a signature on a document in the clear. Alternatively, substantive content 62 may have been encrypted itself and wrapped, as well as being signed, authenticated, verified, and the like.

Thus, cryptographic key generation modules 60, or more properly, key management modules 60, may manage one or more keys. Moreover, those one or more keys may be incoming, outgoing, or the like. Also, those keys 68 may be used on substantive content 62, that is destined to be outgoing, incoming, or both.

Decrypting 110 returns substantive content 62 into the clear. Decrypting 110 may be more complex, exactly the same complexity, or less complex than an encrypting process 106. Nevertheless, in certain embodiments, encrypting 106 and decrypting 110 are substantially mirror images of one another.

Figure 5:
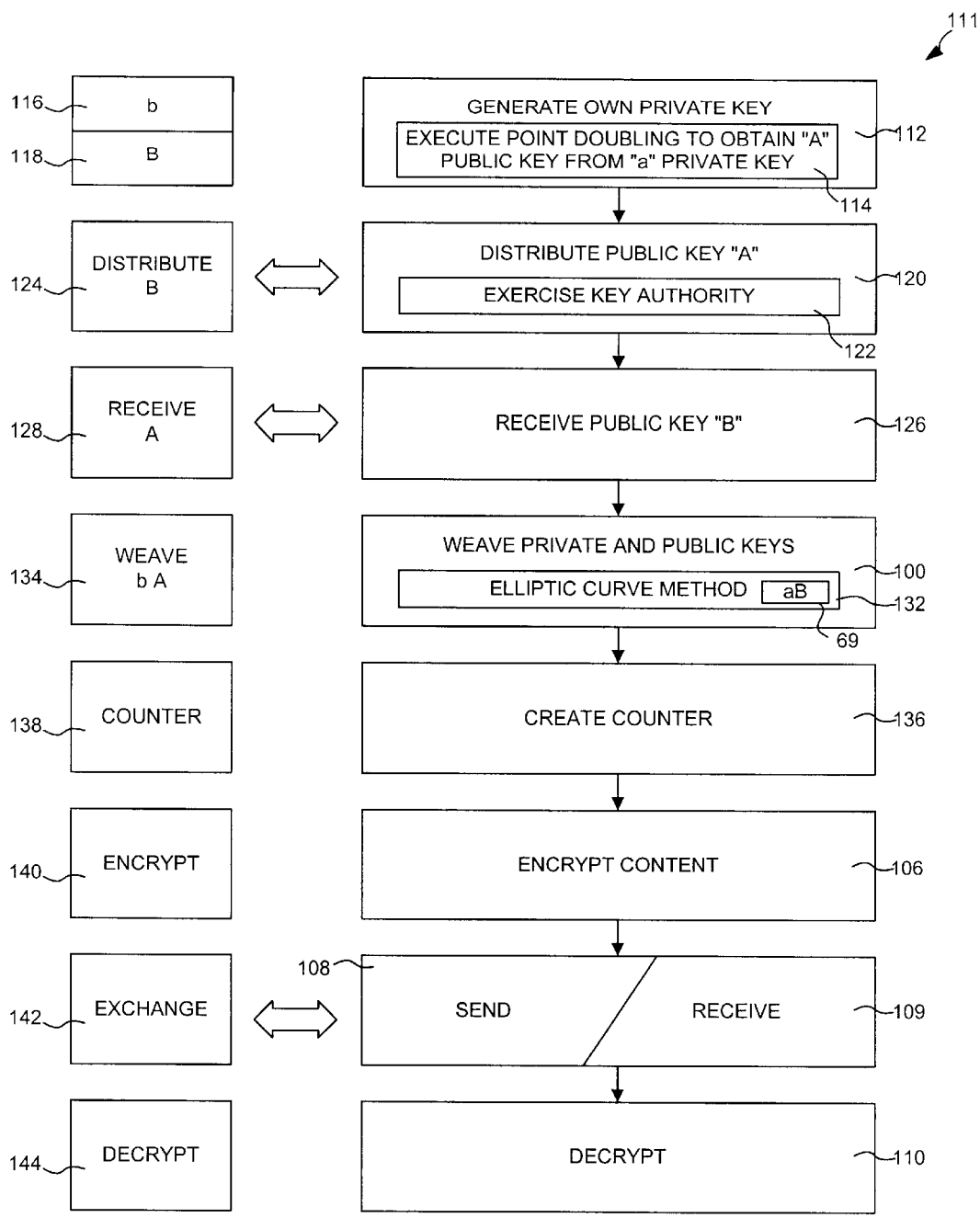
FIG. 5 is a schematic block diagram of a process in accordance with the invention including generation of keys, use of the keys for encryption, and decryption of the content of a message.

Referring to FIG. 5, a method 111 in accordance with the invention may include generating 112 a private key 68b. Generating 112 keys may rely on executing 114 a point-doubling method in order to obtain an initial public key based on a corresponding private key. At another location, a different user who will eventually correspond to an initial user, may also generate 116 a public key from a private key relying on point-doubling 118. At this stage, the generation processes 112, 116 are performed apart.

Distributing 120 a public key 68a may require authorization or other exercise 122 of a key authority. In other words, one may execute 122 or exercise 122 a key authority, where the key authority is an actual entity or where the authority represents the authorization owned by an entity. Accordingly, in a corresponding process, a distribution 124 of a key that will end up being distributed to a first user from a second user may be completed.

Thus, a user "A" may distribute an "A" public key to a user "B." Similarly, a user "B" may distribute a public key "B" to a remote user "A". A user may receive 126 a public key from another user. Accordingly, a corresponding partner in communication may receive 28a a first user's public key.

In certain embodiments, weaving 130 one's own private key with a received public key may rely on an elliptic curve method 132. The elliptic curve method 132 results in a woven key 69. Similarly, weaving 134 results in the same woven key for a remote user. Creating 136, 138 a counter enables an encryption 106, 140 of substantive content 62 being shared between a user "A" and a user "B."

Exactly who is doing the encrypting 106, 140 depends upon the directionality of a message, authentication, or other substantive content 62. Appropriately, a transmission 108 and reception 109, or a send 108 and a receive 109 will represent a particular user. Similarly an exchange 142 (which may be a send 108 or a receive 109) represent activities at a remote user.

Accordingly, decrypting 110, 144 provides the substantive content 62 in the clear. Of course, the substantive content 62 may simply be knowledge provided by transmission of signatures, authentications, and the like. Each of the processes of generating 112 distributing 120, weaving 130, and the like may involve processing of large numerical keys. The use of a method and apparatus in accordance with the invention may be more time-consuming or time-saving depending on the frequency and complexity of any particular key manipulation. Similarly, encrypting 106, 140 and decrypting 110, 144 may use methods in accordance with the invention, depending on the need for security, the complexity, the frequency, and so forth.

Figure 6:
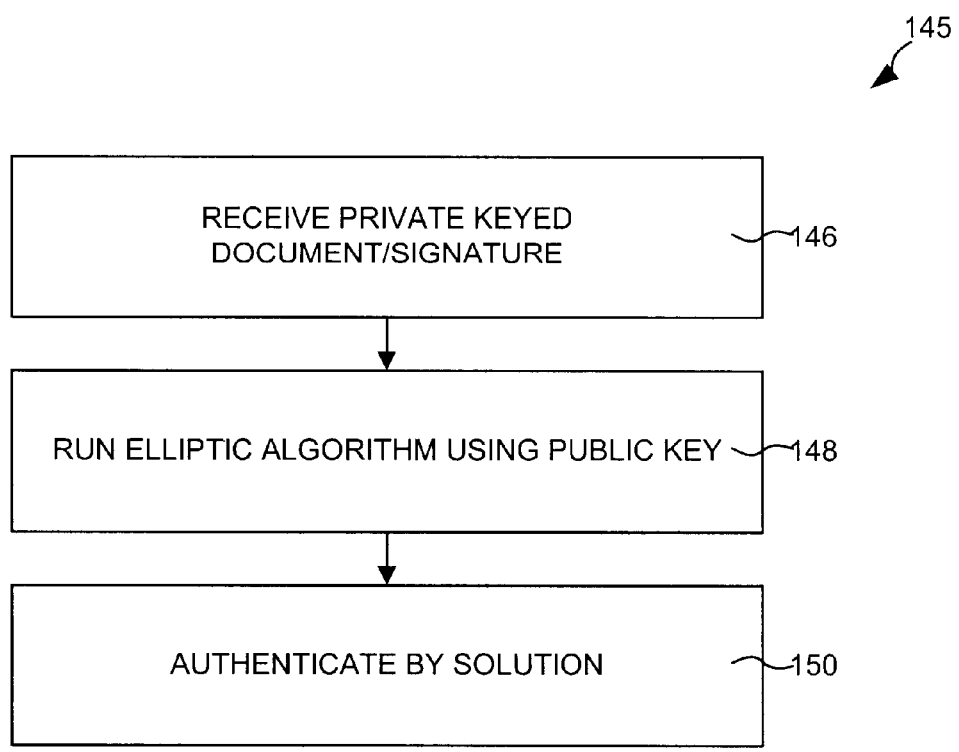
FIG. 6 is a schematic block diagram of an abbreviated method of authentication in accordance with the invention.

Referring to FIG. 6, an embodiment of a method 145 may be simplified to receiving 146 a privately keyed document. A document may actually be a signature. Nevertheless, receiving 146 implies keyed (encrypted) processing.

Next, running 148 an elliptic algorithm using a public key processes information prepared with a private key by an originator. Authenticating 150 may represent a successful calculation of a solution to an equation or set of equations using the keys 68 or a key 68.

Most public key cryptography operations such as key exchange, digital signatures, encryption, and entity authentication, can be implemented very efficiently using elliptic curve arithmetic. An apparatus and method in accordance with the invention may make elliptic curve arithmetic faster, and thereby improve the public key operations. Faster elliptic-curve key exchange, faster elliptic-curve ElGamal encryption, for faster elliptic-curve Digital Signatures, and for faster MQV authentication (see IEEE draft standard P1363), are most useful, although the methods herein may be helpful wherever computations with elliptic curves are used.

Such a method works with any field-element representation, so long as a reasonably efficient reciprocal operation is available. This includes polynomial basis representation, normal basis representation, and field-tower representation. A set of formulas in accordance with the invention may be implemented in a computer program, such as the point doubling module 70. In certain presently preferred embodiments, the point doubling module is configured to generate a key using a single-inversion, point-doubling algorithm, as described immediately below. The same computations can also be carried out very efficiently in firmware, dedicated hardware devices, or in semi-custom logic, such as, for example, smart-cards or FPGA circuits.

The elliptic curve equation for a curve over $GF[2^n]$ is $$Y^2 + XY = X^3 + AX^2 + B. \qquad \text{Eq. 1}$$

X,Y,A,B are all elements from the Galois Field $GF[2^n]$. X and Y are "variables". A and B are "constants", the curve parameters. The elliptic curve K(A,B) is the set of X,Y pairs ("points") that satisfy the equation, together with one additional "point at infinity" denoted O. Different A,B values give rise to different curves. Frequently the equation is simplified by setting A equal to zero, giving a subset of (it turns out) half of the curves. B is required to be nonzero. Each curve has roughly $2^n$ points, but the exact number varies.

Elliptic curves are interesting because the set of points is an abelian (commutative) group with an operation called "addition".

The point at infinity is the identity. It must have a representation. The coordinate pair (0,0) never satisfies the curve equation, so it is available to represent O. The code for manipulating curve points checks for the special value and handles it separately from the main formulas.

The negative of a point (X,Y) is (X,X+Y). Note that addition of finite field elements in a field of characteristic 2 is usually done by xoring the bit representations. The double negative of the point (X,Y) is the negative of (X,X+Y), which is (X,X+X+Y). When the + operator is interpreted as xor, X+X+Y=0+Y=Y for the finite field elements X and Y, so the double negative simplifies to (X,Y) as expected.

The formula for adding two points P1 and P2, (X1,Y1)+(X2,Y2)=(Xa,Ya), is $$Xa = X1 + X2 + M^2 + M + A, \quad \text{with } M = \frac{Y1+Y2}{X1+X2}; \qquad \text{Eq. 2}$$

$$Ya = Y1 + Xa + M(X1 + Xa).$$

M is the slope of the line through the two points.

Special cases arise when either input is the point at infinity, or when X1=X2. If Y1 /=Y2, the two points are negatives, and the sum is the identity O. If Y1=Y2, a special doubling formula must be used.

The formula for doubling a point P, (X,Y)+(X,Y)=(Xd, Yd), is $$Xd = M^2 + M + A, \quad \text{with } M = X + \frac{Y}{X}; \qquad \text{Eq. 3}$$

$$Yd = X^2 + (M + 1)Xd.$$

M is the slope of a line tangent to the curve at P, obtained by formal differentiation of the curve formula, and solving for dY/dX.

An alternative, equivalent formula for Xd is:

$$Xd = X^2 + \frac{B}{X^2}. \qquad \text{Eq. 4}$$

Starting from a given curve point P, we can use the doubling formula to calculate 2P (which is the same as P+P), and the addition formula to calculate 3P (as 2P+P), and either the addition formula or the doubling formula to calculate 4P (as 3P+P or by doubling 2P); either formula gives the same result.

The important operation with elliptic curves is to calculate a large multiple of a given point P. The large multiple is an ordinary integer one or two hundred bits long. The usual algorithm is called double-and-add, and is known in the art. The multiple is written in binary notation. A marker is placed at the high order bit. A running value is initialized to the given elliptic curve point P. The marker is advanced down the binary representation of the multiple. Each time the marker is advanced, the running value is doubled, using one of the point-doubling formulas. If the marked bit in the binary representation is 1, the given point P is added to the running value. The loop stops when the marker passes the low order bit of the binary representation. The running value is the requested multiple of the given point.

The number of doubling steps is pretty much fixed at log2(multiple), but the number of addition steps can be reduced by precalculating a few small multiples of the given point. In one embodiment, the elliptic curve module 74 calculates the odd multiples between −15 and 15. This reduces the number of add steps considerably. On the average, there are six doubling steps between add steps, so it is desirable to make doubling efficient.

A preferred method for doubling a point uses the second formula (Eq. 4) to compute Xd. Thereafter, the first Xd formula (Eq. 3) is used backwards, i.e. the quadratic equation is solved for M. Next, Yd can be calculated. This method works well because of the special properties of GF[2^n], i.e. Squaring is cheap and solving a quadratic is inexpensive.

Point-doubling requires an assortment of field operations in GF[2^n]: one reciprocal operation (to calculate 1/X), one multiplication (to calculate (M+1)*Xd), and three auxiliary calculations: solving the quadratic equation (M^2+M+A=Xd), determining the low bit of the product Y*(1/X) (since M and M+1 are both solutions, the low bit of M must come from the defining formula X+Y/X), and one multiplication by the constant B (to calculate B/X^2). For discussion purposes, cheap operations like adding and squaring are ignored.

Comparing to the direct doubling method (computing M first from X+Y/X, then Xd from M^2+M+A, then Yd), the auxiliary calculations save a multiplication. They are cheaper than the replaced multiplication, but increase code complexity. They also place a premium on selecting a sparse B, so that the constant multiplication is fast. (This seems safe cryptographically, but becomes a constraint on the field representation.)

Single Inversion Point Doubling Without General Multiplication

The improved formula in accordance with an embodiment of the invention removes the field multiplications in point-doubling, when doubling steps are consecutive. An approximate costing: Count multiplication (Mul) as 1, and reciprocal (Rec) as 2.5, and the auxiliary steps in computing M (Aux) as 0.5. The pre-improvement cost of point-doubling is 2.5+0.5+1=4, and point-addition costs 2.5+1+1=4.5. Computing a large multiple of a curve point typically uses six point-doubling steps for every point-addition. Six doubling steps plus one addition step costs 6*4+4.5=28.5. Since there are typically six consecutive point-doublings between point additions, the improved doubling formula can be used five times, reducing the estimated cost from 28.5 to 5*3+4+4.5=23.5.

One aspect of the invention is to use two representations for an elliptic curve point. Sometimes the point is represented as (X,Y), but other times it is represented as (X,R), where R is the ratio Y/X. The XY form may be used for doing point addition, but the faster XR form is used for point-doubling. Various inter-conversion costs may be incurred when switching between the two representations.

The three variables X, R, M are related by the equation X+R+M=0, or equivalently, X+R=M, or X+M=R, or R+M=X. Recall that + denotes XOR in a GF[2] field. An elliptic curve point can be represented by any two of the three variables, and the third calculated when needed. The invention is described with X, R as primary and M as secondary, but any pair, such as X, M is suitable.

Dividing the elliptic curve equation by X^2 gives the XR form:

$$\overset{2}{R} + R = X + A + \frac{B}{X^2}. \qquad \text{Eq. 5}$$

The revised point-doubling formula (also referred to as the single inversion without general multiplication point doubling formula) is $$Xd = \overset{2}{M} + M + A, \quad \text{with } M = X + R; \qquad \text{Eq. 6}$$

$$Rd = M + \frac{B}{X^4 + B}.$$

The formulas still require a reciprocal, but the general field multiplication is gone, replaced by a constant multiplication. This assumes a sparse B, with free constant multiplication.

The formula for Rd can be checked by multiplying it by Xd=X^2+B/X^2:

$$XdRd = XdM + (X^2 + B/X^2)B/(X^4 + B) \qquad \text{Eq. 7}$$

$$= XdM + B/X^2 = MXd + Xd + X^2 = Yd.$$

The extra cost of using the ordinary point-addition formula with XR representation is one multiplication to compute Y1=X1*R1 before applying the addition formula, plus, afterward, a reciprocal to compute 1/Xa, and another multiplication to compute Ra=Ya*(1/Xa) (assuming the second point (X2,Y2) comes from a small precomputed table, and Y2 is free.) The conversion cost: 2 Multiplies plus a Reciprocal=2+2.5=4.5, is equal to the point-addition cost. This is discouraging, since the profit per doubling is only 1 Multiply, and we pay 2*Mul+Rec=4.5 to gain 5*Mul. Since Rec=2.5*Mul, there seems to be very little benefit. It appears that different rearrangements of the formula for Ra=Ya/Xa= M+1+(M X1+Y1)/Xa= . . . , do not improve on the direct computation of Ya and then doing the division to get Ra.

Going from the XY form to XR, and backwards, while doing a point-doubling step, one may use 3 sets of doubling formulas, which combine the conversions with doubling. This retains the benefit of the XR form for consecutive doubling steps, while converting into/outof XY form for doublings that precede or follow a point-addition. A typical sequence of elliptic curve operations would then be . . . xrDxr xrDxr xrDxy xyAxy xyDxr xrDxr . . .

where, for example, xrDxy means to double a point in XR-form, producing an XY-form output. The new formulas are:

xyDxr $$Xd=X^2+B/X^2; \text{ solve } M^2+M+A=Xd \text{ for } M; Rd=M+B/(X^4+B). \qquad \text{Eq. 8}$$

The cost is 2 Rec+Aux. If the routine to solve the quadratic is unavailable or inefficient, then one may compute R=Y/X and use formula xrDxr, in which case the cost is 2 Rec+Mul.

xrDxr $$M=X+R; Xd=M^2+M+A; Rd=M+B/(X^4+B). \qquad \text{Eq. 9}$$

The cost is 1 Rec.

xrDxy $$M=X+R; Xd=M^2+M+A; Yd=X^2+(M+1)Xd. \qquad \text{Eq. 10}$$

The cost is one 1 Mul (especially cheap since R is available).

xyAxy: (usual point-addition formula)

$$M=(Y1+Y2)/(X1+X2); Xa=X1+X2+M^2+M+A; Ya=Y1+Xa+M(X1+Xa). \qquad \text{Eq.11}$$

The cost is 2 Mul+Rec.

An estimate of the cost of a string of K doubling steps is:

$$xyDxr+(K-2)xrDxr+xrDxy=K \text{ Rec}+1 \text{ Mul}+1 \text{ Aux}. \qquad \text{Eq. 12}$$

For a mixture of six point-doublings and one point-addition, the cost is 6*2.5+1+0.5+4.5=21.

The doubling time is noticeably improved when using XR ratio representation of the present invention. For example, in one test, the time went from 480 to 348 microseconds. This increases to 370 when cost of the conversions into and out of XY form are amortized over six doubling steps. The time for a 155-bit point multiplication drops from 94 msec to 77 msec. The savings directly corresponds to saving 110 microseconds on each of 154 doubling steps. The overall run-time improvement is just under 20%.

The improved formulas are also applicable to other field representations. For example, they would work with a field tower scheme. Moreover, they could also be used with an optimal normal basis representation. Certain aspects of the invention may be most useful when a reciprocal is relatively fast compared to multiplication, taking no longer than three multiplication times.

Field Towers are a way of representing field elements that sometimes has faster arithmetic. Field towers express GF[2^N] as a two-level structure. Suppose N=Outer * Inner; the field is GF[GF[2^Inner]^Outer ]. Many different choices of Inner and Outer are possible; it is even possible to represent GF[2^Inner] as another field tower, getting a three-level (or deeper) structure. Depending on the memory architecture of a particular computer, it is often useful to use a field tower representation. A particular successful representation of GF[2^156] is a three-level tower GF[GF[GF[2^13]^6]^2]. Likewise, a successful representation of GF[2^160] is a two-level tower GF[GF[2^16]^10].

An outer-degree of 2 gives particularly simple formulas for computing reciprocals and solving quadratic equations. The innermost field is often small enough that the multiplication and reciprocal operations can be done with table-lookup operations. Desireable results may be obtained on a 25 MHz SPARC IPC using logarithm and exponential tables for Mul and Rec operations in the ground field GF[2^13]. In this case, the tables exactly fit in the 65 KB memory cache, and the cache memory is relatively fast compared to the processor. On a DEC Alpha, the field tower results are mediocre, showing little or no improvement over the standard polynomial representation, because the cache is smaller and the ratio of processor to memory speeds is larger, compared with the SPARC.

Field towers only work when the degree N is a composite number. Some industry and government standards bodies are considering requiring that N be a prime number for their applications; in this case, field towers cannot be used. Some standards also require that the minimum value for N is at least 160.

Using field towers, the cost-ratio of reciprocal to multiplication is closer to 2, and sometimes even less than 2. Accordingly, the benefit of removing the multiplications is larger, favoring the XR formula of the present invention.

In a field tower with outer-extension-degree 2, the outer-field elements are represented as G u+H, where G and H are inner-field elements, and u is the symbolic solution to the field-extension equation u^2+u=L. L is chosen to be one of the 50% of inner-field elements for which the equation has no inner-field solution. There is always a choice available for L which has only a single one-bit, making multiplication by L fast. If the inner field is GF[2^N] and N is odd, then L=1 works.

The outer-field arithmetic formulas are standard: Each formula shows how to compute the outer-field result using operations on inner-field elements.

Addition: $(G1u+H1)+(G2u+H2)=(G1+G2)u+(H1+H2)$  Eq. 13

Negation is No Operation: it does not change an element of GF[2^n]. Subtraction is identical to Addition.
Multiplication:

$(G1u+H1)*(G2u+H2)=(G1*G2+G1*H2+H1*G2)u+(G1*G2*L+H1*H2)$  Eq. 14

Reciprocal:

b $1/(G\ u+H)=(G\ u+(G+H))* 1/(G^2*L+G*H+H^2)$  Eq. 15

Multiplication can be done with only 3 inner-field multiplications, plus a fast multiplication by the single-bit constant L, using a scheme similar to the Karatsuba multiplication method:

Compute $G1*G2$, $H1*H2$, and $(G1+H1)*(G2+H2)$. Then $(G1*G2+G1*H2+H1*G2)=H1*H2+(G1+H1)*(G2+H2)$.  Eq. 16

Reciprocal requires three inner-field multiplications, a fast constant multiplication, two (fast) squarings, and an inner-field reciprocal.
The auxiliary operations are Squaring: $(G\ u+H)^2=G^2u+(G^2*L+H^2)$  Eq. 17

Low-Bit of Product:

Lowbit$((G1\ u+H1)*(G2\ u+H2))$=Lowbit$(G1*G2*L+H1*H2)$=Lowbit$(H1*H2)$+Lowbit$(G1*G2*L)$.  Eq. 18

When L=1, the Lowbit(G1*G2*L) is just Lowbit (G1*G2). Otherwise, one can use fast constant multiplication to compute G2*L, and then Lowbit(G1*(G2*L)). Alternatively, a routine can be written which extracts the bit(s) corresponding to L.

In a Quadratic Solution:
Qsolve(T) denotes the field element X which solves the equation $X^2+X=T$, when there is a solution. The map $f(X)=X^2+X$ is precisely 2-to-1. Half of the possible Ts have no corresponding X, and the rest have two possible Xs which differ by 1. Qsolve(G u+H) fails (or succeeds) if-and-only-if Qsolve(G) fails (or succeeds).

Qsolve$(G\ u+H)$=Qsolve$(G)u$+Qsolve$(H+(G+$Qsolve$(G))*L)$.  Eq. 19

When computing the second term Qsolve(H+ . . . ), the Qsolve may fail. In this case, add 1 to Qsolve(G) to get the other solution for Qsolve(G) and recompute the second term Qsolve(H+ . . . ); it will succeed because the argument to Qsolve has changed by L.

In field towers with outer-degrees larger than 2, the formulas for Addition, Multiplication, and Squaring are standard. There are standard reciprocal formulas, which are sometimes more efficient than the extended GCD method. Low-Bit of Product can be computed from the Low-Bit of the inner-field constant term, by analogy with the formula above for outer-degree 2. There are also formulas for the Quadratic Solution operator, of varying complexity, depending on the details of the outer-degree extension polynomial. In these cases, it may be better to use the alternative xyDxr formula, that does not need a Qsolve algorithm. Algorithms are known for Qsolve in a general GF[2] field.

When verifying a digital signature, and in some more complicated communications protocols, including protocols with more than two parties, linear combinations of two or more elliptic curve points are calculated. For example, elliptic curve points P and Q might be provided, along with large integers R and S, and the computation of R*P+S*Q required.

A trick is known that makes the computation of this linear combination only a little more costly than the computation of R*P (or S*Q). This trick uses point-doublings mixed with point additions. The invention works with this trick, saving time when the doublings are consecutive. It will work similarly when more complicated combinations of elliptic curve points are required. The benefit is reduced with two or more elliptic curve points, because the average length of a run of consecutive doublings is smaller.

The algorithms presented here are well suited for implementation in hardware. The basic finite field operations, such as xor multiplication and the almost-inverse algorithm for reciprocals require about a dozen registers of length equal to the field element, and a couple of double-length registers to hold products, squares, and do reductions modulo the field polynomial. A small memory capable of holding about 20 elliptic curve points is used to hold the table of pre-computed small-odd-multiples, and the intermediate values for the elliptic-curve computations.

In one example of key exchange using the improvements, an elliptic curve public key system is created by choosing a particular field GF[2^N], and an elliptic curve over the field by selecting the constant coefficients A and B, and a point P on the elliptic curve with coordinates (X,Y) satisfying the elliptic curve equation.

For example, Carol may select a secret random N-bit number C, and use it as a multiplier to create an elliptic curve point CP. Carol may then use the bit-representation of the elliptic curve point as a signal, which may be transmitted to Dave, perhaps over a network. Dave receives the signal, and interprets it as the bit-representation of an elliptic curve point. He knows this point to be CP, but does not know C.

Dave, in turn, selects a secret random N-bit number D, and uses it as a multiplier to create the elliptic curve point DP. He converts the bit-representation of this point to a signal which he transmits to Carol. Carol receives the signal, and interprets it as the bit-representation of the elliptic curve point DP.

Meanwhile, Dave computes the multiple D of the elliptic curve point CP, getting the elliptic curve point DCP. After Carol receives Dave's signal, she computes the multiple C of the elliptic curve point DP, getting the elliptic curve point CDP. Because of the group structure of the elliptic curve, CDP and DCP are equal, having the same bit-representation. These bits can be used in a well-known manner to create a cryptographic key which is used to encrypt further messages between Carol and Dave, assuring them of private communications.

The invention speeds up the computation of the elliptic curve points CP, DP, DCP, and CDP. This allows Carol and Dave to establish a private communication channel more rapidly than before.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. An apparatus comprising:
   a system for creating a key configured to support cryptographic manipulation of information;
   a memory device operably connected to the system for storing the key and executables programmed to operate on the key;
   an encrypting device operably connected to the system for controlling an encryption process using the key;
   the system further configured to execute an elliptic curve method for generating the key; and
   the system further configured to execute a single-inversion without general multiplication, point-doubling algorithm for generating the key.

2. The apparatus of claim 1, wherein the key is configured to be processable by the system for divulging independently to two independent parties a secret to be shared by the two independent parties.

3. The apparatus of claim 1, wherein the single-inversion without general multiplication, point-doubling algorithm is further programmed to reduce the operation count of a cryptographic process.

4. An article comprising a computer-readable memory storing operational and executable data, the operational and executable data comprising:
   an encryption engine for operating on keys configured to encrypt substantive content representing information;
   the encryption engine, further comprising a key generation module for operating on the keys;
   the key generation module, further comprising an elliptic curve module for providing the keys; and
   the elliptic curve module, further comprising a single-inversion without general multiplication, point-doubling module for calculating points related to the key.

5. The article of claim 4, wherein the point doubling module further comprises a register for storing an ordered pair of variables selected to be operated on for executing single-inversion point-doubling.

6. The article of claim 5, wherein the ordered pair represents a set of coordinates corresponding to a point on an elliptic curve.

7. The article of claim 4, wherein the point-doubling module further comprises a plurality of ordered tuples reflecting points on an abelian variety.

8. The article of claim 7, wherein the ordered tuples are ordered pairs.

9. The article of claim 5, wherein the ordered pair further comprises a first element and a second element, and wherein the value of the second element comprises the result of an exclusive OR operation on the first element and a previous value of the second element.

10. The article of claim 5, wherein the ordered pair further comprises first and second elements, and wherein the second element is a ratio reflecting coordinates of a first point on an elliptic curve.

11. The article of claim 10, wherein the ratio is a quotient of a Y coordinate divided by an X coordinate of a point on an elliptic curve.

12. The article of claim 10, wherein the first point is computed by a computation method selected from the group consisting of a multiplication, a division, and a multiplication and a division.

13. The article of claim 12, wherein the computation method operates on first and second points on an elliptic curve.

14. The article of claim 7, wherein the abelian variety further comprises a hyperelliptic curve.

15. The article of claim 4, further comprising an application module programmed to execute a function selected from encryption of a substantive content, decryption, maintaining privacy of private information, authentication of received information, validation of exchanged information, a digital signature, hashing, key distribution, random number generation, determining the order of a curve, determining the order of a point, determining the discrete logarithm of the point, and breaking a cryptographic system.

16. The article of claim 4, wherein the elliptic curve module further comprises a point multiplication algorithm using two distinct representations of a selected one or more points on an elliptic curve.

17. The article of claim 16, wherein the two distinct representations comprise a first representation and a second representation, and wherein the point multiplication algorithm selectively alternates between processing the first representation and the second representation.

18. The article of claim 17, wherein the selectivity is independent of initial and final conditions of the selected point.

19. A method comprising:
   generating a cryptographic key using an elliptic curve method, wherein the elliptic curve method uses a single-inversion without general multiplication, point-doubling algorithm; and
   encrypting a substantive content using the generated key.

20. The method of claim 19, wherein the key is configured to be processable by an encryption system for divulging independently to two independent parties a secret to be shared by the two independent parties.

21. An article comprising a computer-readable memory storing operational and executable data, the operational and executable data comprising:
   an encryption engine for operating on keys configured to encrypt substantive content representing information;
   the encryption engine, further comprising a key generation module for operating on the keys;
   the key generation module, further comprising an elliptic curve module for providing the keys, wherein the elliptic curve module represents a first variable by a first representation and a second variable by a second representation, the first variable and the second variable together representing a point on an elliptic curve; and
   the first representation and the second representation being exclusively selected from a group consisting of a first expression comprising the X coordinate of the point, a second expression comprising a ratio equal to a quotient of the Y coordinate divided by the X coordinate of the point on the elliptic curve, and a third expression comprising a result of an exclusive OR operation on the X coordinate of the point and a ratio equal to a quotient of the Y coordinate divided by the X coordinate of the point on the elliptic curve.

22. The article of claim 21, wherein the elliptic curve module further comprises a single-inversion without general multiplication, point-doubling module for calculating points related to the key.

23. A method comprising:
  generating a cryptographic key using an elliptic curve method, wherein the elliptic curve method comprises:
    providing an ordered pair representing an elliptic curve point and having a first representation; and
    performing a point doubling operation on the ordered pair to produce a second ordered pair representing the double of the elliptic curve point and having a second representation distinct from the first representation; and
  encrypting a substantive content using the generated key.

24. The method of claim 23, wherein the first representation and the second representation are exclusively selected from a group consisting of a first expression comprising the X coordinate of the elliptic curve point and the Y coordinate of the elliptic curve point, a second expression comprising the X coordinate of the point and a ratio equal to a quotient of the Y coordinate divided by the X coordinate of the point on the elliptic curve, a third expression comprising the X coordinate of the point and a result of an exclusive OR operation on the X coordinate of the point and a ratio equal to a quotient of the Y coordinate divided by the X coordinate of the point on the elliptic curve, and a fourth expression comprising a ratio equal to a quotient of the Y coordinate divided by the X coordinate of the point on the elliptic curve and a result of an exclusive OR operation on the X coordinate of the point and a ratio equal to a quotient of the Y coordinate divided by the X coordinate of the point on the elliptic curve.

25. The method of claim 24, wherein the elliptic curve method uses a single-inversion without general multiplication, point-doubling algorithm.

* * * * *